US006199585B1

(12) United States Patent
Reith et al.

(10) Patent No.: US 6,199,585 B1
(45) Date of Patent: Mar. 13, 2001

(54) DIRECTIONAL-CONTROL VALVE

(75) Inventors: Werner Reith, Eussenheim; Binh Nguyen Xuan, Frammersbach, both of (DE)

(73) Assignee: Mannesmann Rexroth AG, Lohr (DE)

( * ) Notice: Subject to any disclaimer, the term of this patent is extended or adjusted under 35 U.S.C. 154(b) by 0 days.

(21) Appl. No.: 09/380,855

(22) PCT Filed: Mar. 3, 1998

(86) PCT No.: PCT/EP98/01181

§ 371 Date: Oct. 7, 1999

§ 102(e) Date: Oct. 7, 1999

(87) PCT Pub. No.: WO98/40652

PCT Pub. Date: Sep. 17, 1998

(30) Foreign Application Priority Data

Mar. 13, 1997 (DE) ............................................. 197 10 318

(51) Int. Cl.$^{7}$ .......................... F15B 13/043; F16K 37/00

(52) U.S. Cl. ........................ 137/554; 137/625.64; 251/51

(58) Field of Search .............................. 137/554, 625.64; 251/51

(56) References Cited

U.S. PATENT DOCUMENTS 3,551,620 12/1970 Hoover .
4,342,331 * 8/1982 Bartholomaus et al. ........ 137/554 X
4,478,245 * 10/1984 Bender ................................ 137/554
4,593,719 * 6/1986 Leonard ...................... 137/625.64 X
4,850,394 * 7/1989 Imhof et al. ......................... 137/554
4,938,118 * 7/1990 Wolfges et al. ............. 137/625.64 X
5,553,827 * 9/1996 Perkey ........................ 137/625.64 X

FOREIGN PATENT DOCUMENTS 3236636 4/1984 (DE) .
3420400 12/1985 (DE) .
9015899 2/1991 (DE) .
0124242 11/1984 (EP) .

* cited by examiner

*Primary Examiner*—Gerald A. Michalsky
(74) *Attorney, Agent, or Firm*—Roylance, Abrams, Berdo & Goodman, L.L.P.

(57) ABSTRACT

A directional control valve has an axially displaceable control piston inside a valve housing and a travel sensor arranged on the valve housing to detect the position of the control piston. The sensor includes a travel sensor tube which is pressure tight and sealed on one end and has a directional transmitter rod extending into the other end. The directional transmitter rod is secured to the control piston and extends through the area connecting the inside of the valve housing to the travel sensor tube. A seal exposes a dampening gap placed in the connecting area forming a throttle point enabling oil to flow into the travel sensor tube.

14 Claims, 2 Drawing Sheets

DIRECTIONAL-CONTROL VALVE

FIELD OF THE INVENTION

The present invention relates to a directional control valve with an axially displaceable control piston in the interior of a valve housing and a travel sensor to detect the position of the control piston. The travel sensor has a pressure-tight travel sensor tube sealed at one end, with a directional transmitter rod telescoped in the opening at the other end. The rod is fastened to the control piston and extends in the direction of its axial displacement through a passage connecting the valve housing interior chamber with the travel sensor tube.

BACKGROUND OF THE INVENTION

A proportional modular valve, with an axially displaceable control piston and a travel sensor for the control piston, is manufactured by the Mannesmann Rexroth Aktiengesellscaft, and is commercially available under the reference 3WRC. Such valves preferably adjust the volume of hydraulic oil flows, for instance with forging equipment, power press cylinders, dye casting machinery and the like.

These valves are characterized by simple construction, because the travel sensor by virtue of its pressure-tight construction can be mounted directly in the passage of the valve housing. The directional transmitter rod extends out of the valve housing interior chamber and into the opening of the travel sensor tube. Since with this type of structure the user pressure prevailing in the passage is also effective in the pressure-tight travel sensor tube, the danger exists that, in cases wherein high pressure peaks with steep gradient sides occur in the user pressure, plastic bulging or expanding of the pressure-tight travel sensor tube can occur. This frequently leads to disturbances in position detection, especially in the case of the use of inductive travel sensors with coil bodies positioned on the travel sensor tube. The winding can tear, leading to breakdown of the associated control electronics, and with that the breakdown of the valve.

SUMMARY OF THE INVENTION

Objects of the present invention are to provide a directional control valve with an axially displaceable control piston and a travel sensor for detecting the control piston position that is an improvement in comparison with other such valves because of a higher quality of operation.

The foregoing objects are basically attained according to the present invention with a directional control valve, comprising a valve housing having an interior chamber and a passage, a control piston axially displaceable in the interior chamber, and a travel sensor mounted on the housing to detect positions of the control piston. The travel sensor has a travel sensor tube and a directional transmitter rod. The sensor tube is connected to the interior chamber through the passage, is sealed pressure-tight at one end thereof and has an opening at a second end thereof. The transmitter rod is telescopically displaced in the opening, is fixedly coupled to the control piston and extends in direction of axial displacement thereof through the passage. A seal is in the passage between the interior chamber and the opening of the travel sensor tube. The seal controls opening dimensions of a dampening gap and forms a throttle point allowing oil flow into the travel sensor tube. The seal includes a check valve blocking oil flow into the travel sensor tube.

The throttling of the oil flow in the travel sensor tube provided according to the present invention dampens the volume of hydraulic oil flow occurring when a pressure peak occurs in the user pressure. This sufficiently throttles the flow in the direction of the travel sensor that rising pressure in the travel sensor tube no longer leads to plastic deformation of the tube, and consequently to impairment of the function of the position detection of the travel sensor.

With one preferred embodiment, the seal mounted in the passage forms the dampening gap. With the check valve, oil which is expelled with the telescoping movements of the directional transmitter rod in the travel sensor tube can flow back over the check valve to the interior chamber of the valve housing. Thus, even the occurrence of compression pressure peaks in the travel sensor tube resulting from telescoping movements of the directional transmitter rod is avoided.

Preferably the dampening gap is provided on the valve body of the check valve.

This valve body can be constructed in an especially advantageous embodiment as a perforated disk having a central passage opening. Its side facing the travel sensor tube can cooperate with a shoulder surface serving as valve seat surface, constructed on a setoff of the passage. The perforated disk with its passage opening can be guided on the directional transmitter rod with a degree of play forming the dampening gap.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which for a part of this disclosure.

DETAILED DESCRIPTION OF THE INVENTION

Figure 1:
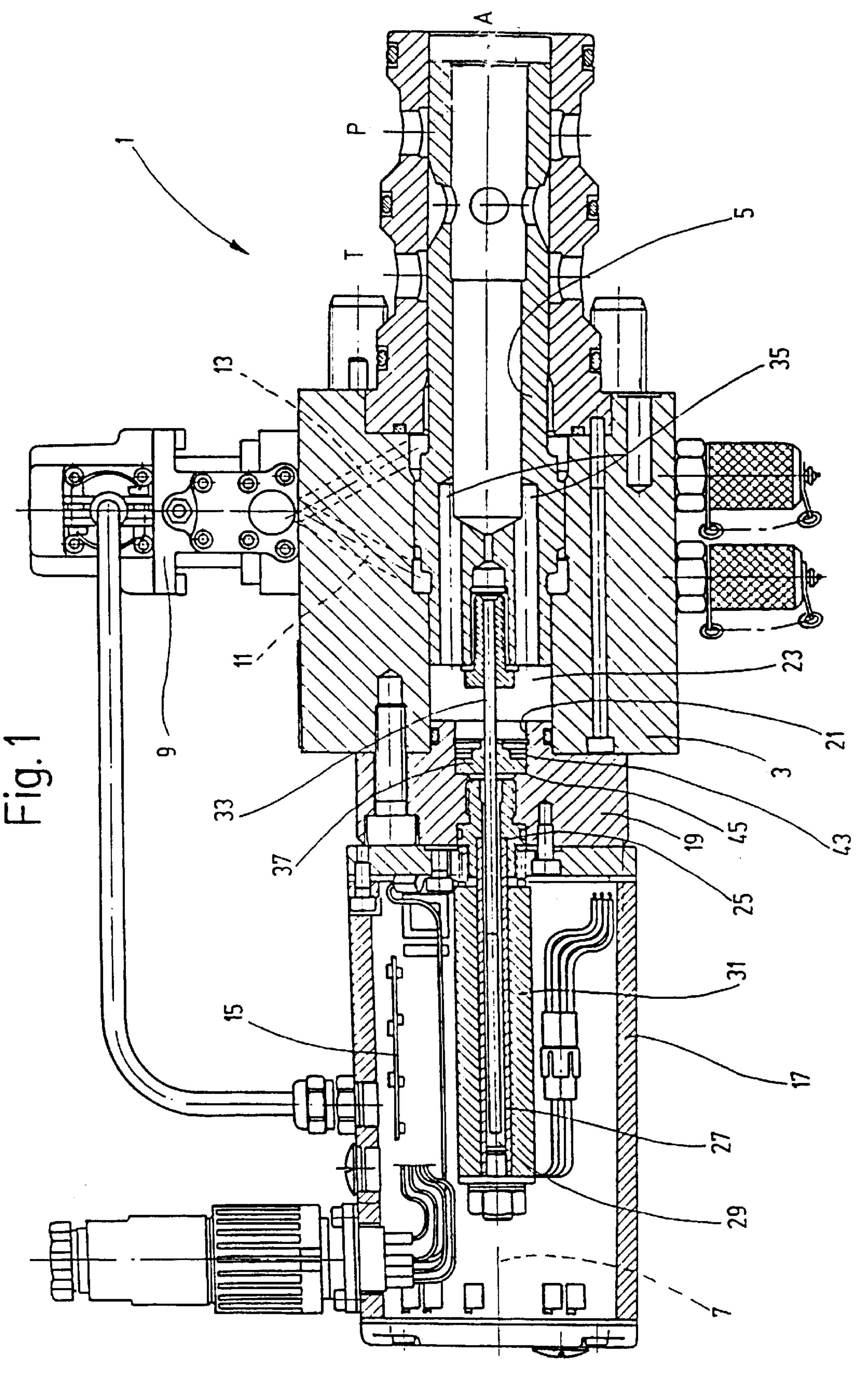
FIG. 1 is a partially diagrammatic side elevational view in section of a directional control valve according to an embodiment of the present invention.

A directional control valve installation, shown in its entirety as 1 in FIG. 1, has a valve housing 3, in which a control piston 5 can be displaced by relative telescoping movement in axial directions relative to the housing longitudinal axis 7. The axial displacement of the control piston provides a 3/2-directional-function with a continuous adjustment of hydraulic oil flow volume from hydraulic oil connection P to user connection A and from connection A to tank connection T. Control of connections 11 and 13 of the directional control valve is by means of a servo valve 9, as shown in FIG. 1. Control electronics 15 are provided for the operation of servo valve 9, which control electronics are configured in a traditional manner, and thus, are not illustrated and described in greater detail. Control electronics 15 are mounted in the housing of an inductive travel sensor 17. The sensor housing is screw-attached to valve housing 3 and extends over control electronics 15 forming part of the positioning adjustment circuit.

Figure 2:
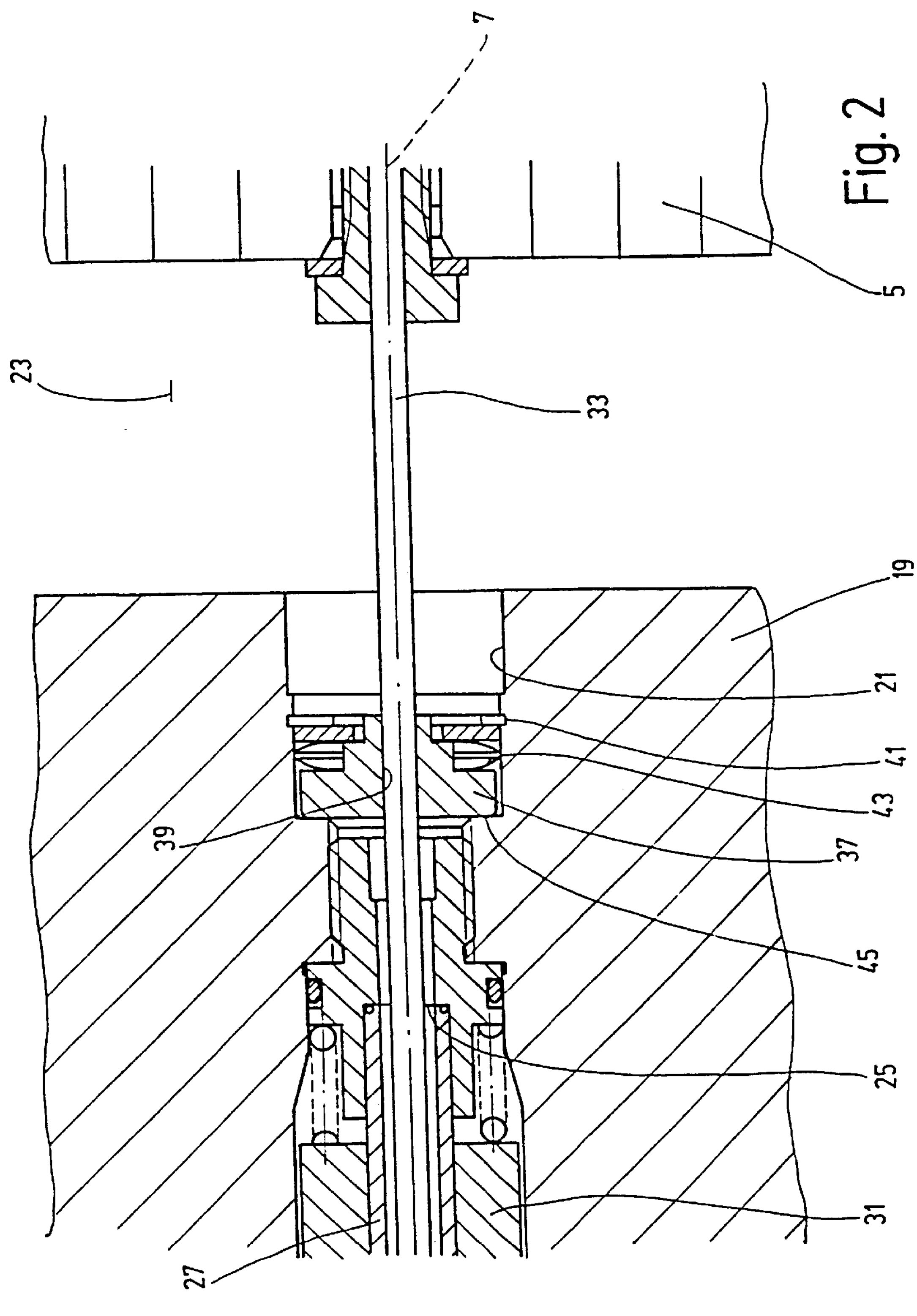
FIG. 2 is an enlarged, partial side elevational view in section of the directional control valve of FIG. 1 in the area of the passage extending from the valve housing interior chamber to the travel sensor.

Travel sensor 17 is connected with valve housing 3 through an intermediate member 19. Member 19 forms a passage 21 sealed off from the outside, pressure-tight extending from the adjacent valve housing interior chamber 23 to the facing opening 25 of a travel sensor tube 27. Tube 27 is sealed off pressure-tight on its end 29 remote from the opening 25 (FIG. 2). On the outside of travel sensor tube 27, which tube extends coaxial to longitudinal axis 7, a tape-wrapped coil body 31 is set in position.

A directional transmitter rod 33, extending coaxial to axis 7, is fastened to the front surface of control piston 5 adjacent to passage 21 and extends through open end 25 into travel sensor tube 27. Directional transmitter rod 33, in a known manner, includes an essentially nonmagnetic core support rod. At the front end of the support rod a soft iron rod is welded. In terms of being a ferromagnetic core, the soft iron rod cooperates with the tape-wrapped coil body 31 for travel-dependent influencing of the inductance.

Because of the pressure compensation achieved by passage channels 35 in control piston 5 during operation in the area of the valve housing interior chamber 23 bordering on passage 21, the pressure of user connection A prevails. Through passage 21 and through adjacent end 25 of travel sensor tube 27, which is sealed off pressure-tight on its other end 29, this pressure is also generated in travel sensor tube 27. A dampening device is located in passage 21, in order to avoid the build-up of pressure peaks in travel sensor tube 27 when sudden or irregular pressure modifications occur in the valve housing interior chamber 23. Such pressure modifications can lead to plastic deformations, and thus to damaging effects on the tape-wrapping of coil body 31. The dampening device provides an oil flow only through a throttle point in travel sensor tube 27.

A seal provided in passage 21 undertakes this dampening function. The seal seals or closes off passage 21, except for a dampening gap which forms a throttle point for the oil flow in travel sensor tube 27. With the embodiment as shown and described, the dampening gap is formed on a perforated disk 37 arranged with its central passage opening 39 on directional transmitter rod 33. The interior diameter of passage opening 39 is somewhat larger than the exterior diameter of directional transmitter rod 33, to form the dampening gap between this part and the interior wall of passage opening 39.

A spring element is propped in passage 21 by means of a retaining ring 41 (FIG. 2). In the exemplary embodiment, this ring element comprises disk springs 43 and prestresses or biases the side of perforated disk 37 adjacent to travel sensor tube 27 into contact with a shoulder surface 45 formed by an offset of passage 21.

Perforated disk 37 together with shoulder surface 45 operate as valve seat surface, and, thus, form a check valve which blocks the oil flow into travel sensor tube 27, except for the throttled oil flow which can pass through the dampening gap. On the other hand, when, upon displacement of piston 5, directional transmitter rod 33 telescopes into travel sensor tube 27, and thus displaces or expels a certain volume of oil. These oil volumes are discharged in the discharge direction of the check valve, so that no pressure peak originating through piston movement occurs in travel sensor tube 27.

In the exemplary embodiment shown in FIG. 2, the exterior diameter of perforated disk 37 is somewhat smaller than the interior diameter of the adjacent segment of passage 21. In this manner, perforated disk 37 is guided only on the directional transmitter rod 33 to diminish the friction forces working on perforated disk 37, and thus, also to decrease the wear.

Instead of the seal being in the form of a check valve controlling the opening dimensions of a dampening gap, as provided in the illustrated exemplary embodiment, a traditional sealing element could be provided. Naturally occurring leakage throttles the oil flow, to generate in the interior of the travel sensor tube 27 an essentially static, interior pressure, in other words a pressure free of pressure peaks with steeply graded sides.

While a particular embodiment has been chosen to illustrate the invention, it will be understood by those skilled in the art that various changes and modifications can be made therein without departing from the scope of the invention as defined in the appended claims.

What is claimed is:

1. A directional control valve, comprising:

a valve housing having an interior chamber and a passage;

a control piston axially displaceable in said interior chamber;

a travel sensor mounted on said housing to detect positions of said control piston, said travel sensor having a travel sensor tube and a directional transmitter rod, said sensor tube being connected to said interior chamber through said passage, being sealed pressure-tight at one end thereof and having an opening at a second end thereof, said transmitter rod being telescopically displaced in said opening, being fixedly coupled to said control piston and extending in a direction of axial displacement thereof through said passage; and a seal in said passage between said interior chamber and said opening of said travel sensor tube, said seal controlling opening dimensions of a dampening gap and forming a throttle point allowing oil flow into said travel sensor tube, said seal including a check valve blocking oil flow into said travel sensor tube.

2. A directional control valve according to claim 1 wherein leakage through said seal forms throttled oil flow in said travel sensor tube.

3. A directional control valve according to claim 2 wherein said travel sensor inductively detects positions of said control piston, and comprises a coil body with a winding positioned on said travel sensor tube and a ferromagnetic core carried by said directional transmitter rod that modulates or influences inductance of said coil body.

4. A directional control valve according to claim 1 wherein said check valve comprises a valve body having said dampening gap.

5. A directional control valve according to claim 4 wherein said passage comprises an offset forming a shoulder surface serving as a valve seat surface; and said valve body comprises a perforated disk having a central passage opening and a side adjacent said travel sensor tube cooperating with said shoulder surface, said directional transmitter rod being guided in said central passage opening with a certain amount of play forming said dampening gap.

6. A directional control valve according to claim 5 wherein a spring element biases said perforated disk into contact with said valve seat surface.

7. A directional control valve according to claim 6 wherein said perforated disk comprises an exterior diameter smaller than an interior diameter of a segment of said passage receiving said perforated disk.

8. A directional control valve according to claim 7 wherein said travel sensor inductively detects positions of said control piston, and comprises a coil body with a winding positioned on said travel sensor tube and a ferromagnetic core carried by said directional transmitter rod that modulates or influences inductance of said coil body.

9. A directional control valve according to claim 6 wherein said travel sensor inductively detects positions of said control piston, and comprises a coil body with a winding positioned on said travel sensor tube and a ferromagnetic core carried by said directional transmitter rod that modulates or influences inductance of said coil body.

10. A directional control valve according to claim 5 wherein said perforated disk comprises an exterior diameter smaller than an interior diameter of a segment of said passage receiving said perforated disk.

11. A directional control valve according to claim 10 wherein said travel sensor inductively detects positions of said control piston, and comprises a coil body with a winding positioned on said travel sensor tube and a ferromagnetic core carried by said directional transmitter rod that modulates or influences inductance of said coil body.

12. A directional control valve according to claim 5 wherein said travel sensor inductively detects positions of said control piston, and comprises a coil body with a winding positioned on said travel sensor tube and a ferromagnetic core carried by said directional transmitter rod that modulates or influences inductance of said coil body.

13. A directional control valve according to claim 4 wherein said travel sensor inductively detects positions of said control piston, and comprises a coil body with a winding positioned on said travel sensor tube and a ferromagnetic core carried by said directional transmitter rod that modulates or influences inductance of said coil body.

14. A directional control valve according to claim 1 wherein said travel sensor inductively detects positions of said control piston, and comprises a coil body with a winding positioned on said travel sensor tube and a ferromagnetic core carried by said directional transmitter rod that modulates or influences inductance of said coil body.

* * * * *